United States Patent [19]
Haas et al.

[11] Patent Number: 5,133,594
[45] Date of Patent: * Jul. 28, 1992

[54] TRANSPARENT ION-BLOCKING LAYER FOR ELECTROCHROMIC WINDOWS

[75] Inventors: Terry Haas, Sudbury; Ronald Goldner, Lexington; Linas Jauniskis, Dover; Floyd Arntz, Newtonville; Kwok-Keung Wong, Watertown; Eugene Sullivan, Somerville, all of Mass.

[73] Assignee: Tufts University, Medford, Mass.

[*] Notice: The portion of the term of this patent subsequent to May 23, 2006 has been disclaimed.

[21] Appl. No.: 554,541

[22] Filed: Jul. 19, 1990

[51] Int. Cl.$^5$ .............................................. G02F 1/01
[52] U.S. Cl. .................................................. 359/275
[58] Field of Search ....................... 350/357, 353, 355

[56] References Cited

U.S. PATENT DOCUMENTS

| | | | |
|---|---|---|---|
| 4,781,444 | 11/1988 | Suginoya et al. | 350/357 |
| 4,787,716 | 11/1988 | Kato et al. | 350/357 |
| 4,832,463 | 5/1989 | Goldner et al. | 350/357 |
| 4,889,414 | 12/1989 | Rauh et al. | 350/357 |
| 4,927,246 | 5/1990 | Ito et al. | 350/357 |

*Primary Examiner*—Rolf Hille
*Assistant Examiner*—Mahshid Saadat

[57] ABSTRACT

Ion blocking layers are interposed between the outer electrodes and the active layers in a five-layer electrochromic device. The ion-blocking layers are optically transparent and electronically conductive to provide for electron transport while blocking the transport of ions between the active layers and the outer electrode layers.

5 Claims, 3 Drawing Sheets

TRANSPARENT ION-BLOCKING LAYER FOR ELECTROCHROMIC WINDOWS

BACKGROUND OF THE INVENTION

U.S. Pat. No. 4,832,463 entitled "Thin Film Ion-Conducting Coating" describes durable, thin film ion-conducting coatings formed on a transparent glass or plastic substrate by the controlled deposition of lithium tantalate or lithium niobate. The coatings provide durable ion transport sources for thin film solid state storage batteries and electrochromic energy conservation devices.

When subjected to a low voltage pulse of a first polarity, electrons are transferred through the first outer electrode layer into the electrochromic layer cathodically coloring the layer and providing the long wave reflective state for heat reflectors. At the same time, to ensure charge compensation, there is a transfer of positive ions from the counter-electrode layer through the ion-conducting layer into the electrochromic layer. To change the electrochromic device from its heat reflective and light transmissive state to the heat and light transmissive state, the battery or other electrical power supply polarity is reversed and a low voltage potential is applied to the device whereby ions transfer into the electrochromic device to change the electrochromic layer to its heat transmissive state.

Upon the application of a voltage required for electron transfer, the positive ions could transfer to the outer electrode layers and interact with the indium-tin oxides within the layers to deplete the device of requisite positive ions. The ions could also become exposed with the atmosphere about the device and irreversibly react with the atmospheric gases.

Upon long periods of continued use under such overvoltage conditions, the modulation of the electrochromic layers becomes reduced due to the loss of positive ions to the outer electrode layers and the surrounding environment.

One purpose of the instant invention accordingly is to provide a transparent ion-blocking layer between the active layers and the outer electrode layers to prevent irreversible transfer of ions to the outer electrode layers.

SUMMARY OF THE INVENTION

Transparent ion-blocking layers are interposed between the outer transparent electrode layers and interactive layers of a five-layer electrochromic device to prevent the irreversible transfer of ions out from the active layers. Zinc and cadmium oxide compositions and silicon carbide allow for the transfer of electrons while effectively blocking ion transport. The zinc and cadmium oxides and silicon carbide retain their optically transmissive properties indefinitely.

DESCRIPTION OF THE PREFERRED EMBODIMENT

Before describing the function and composition of the ion-blocking layers of the invention, it is helpful to review the five-layer thin film ion-conducting coating described within the aforementioned Patent, which is incorporated herein for purposes of reference.

Figure 1:
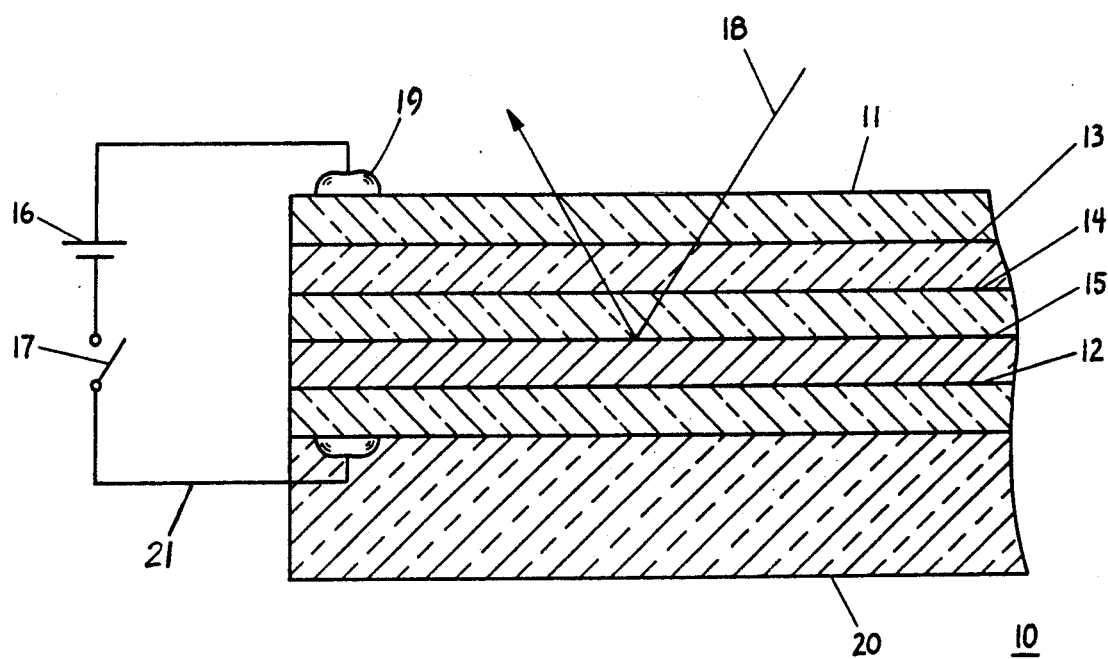
FIG. 1 is a cross-sectional side view of a five-layer electrochromic device in accordance with the prior art with the electrochromic layer in its thermally-reflective state.

The deposited five-layer electrochromic structure 10 on a glass substrate 20 is depicted in FIG. 1 wherein the layered structure includes an ion-conducting layer 14. The layered structure is hereinafter referred to as a "smart window", whereby an electric field provided by means of a low voltage battery 16 and switch 17 is applied to the smart window by means of indium or other such metal electrodes 19 and wire conductors 21. The polarity of the battery 16 governs the nature of the electric charge transporting between the first outer electrode transparent electron conducting layer 11, counter-electrode layer 13, ion-conducting layer 14, electrochromic layer 15, and the second outer electrode transparent conducting layer 12. When switch 17 is closed, the field across the smart window causes ions to conduct from the electrochromic layer 15 to the counter-electrode layer 13 through the ion-conducting layer 14, resulting in the "bleached" state whereby the transmittance through the glass substrate 20 is a maximum. Representative light ray 18 represents wavelengths larger than 0.7 micron, defined as the "near-infrared" region of the optical spectrum. The infrared region of the solar spectrum is that region whereby most of the usable heat energy from the sun is transmitted.

Figure 2:
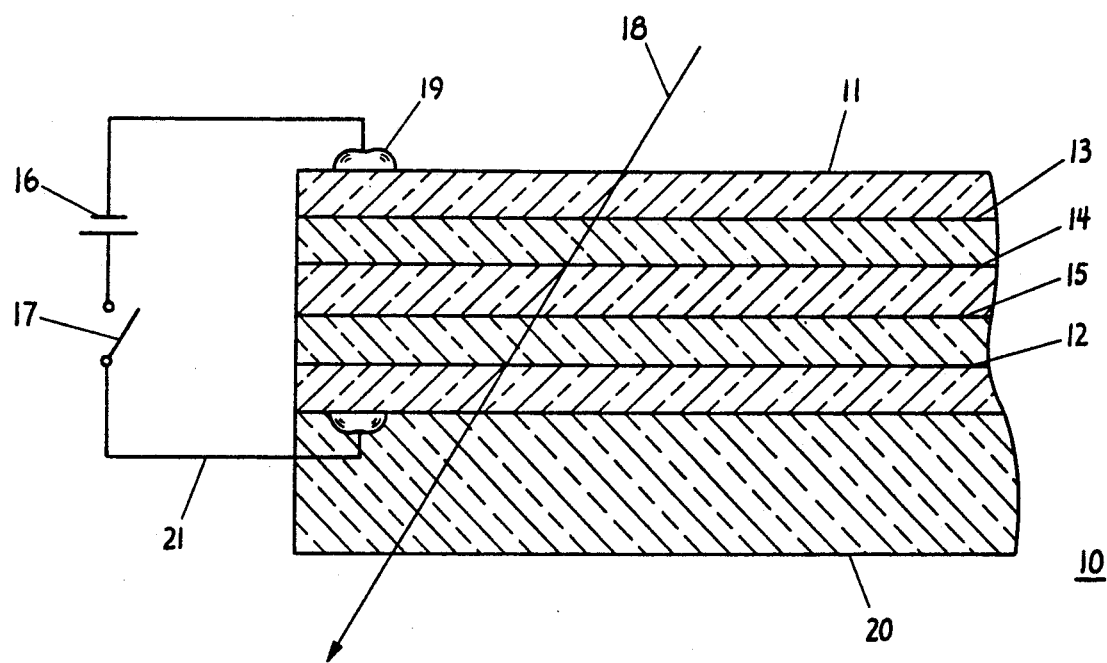
FIG. 2 is a cross-sectional side view of the electrochromic device of FIG. 1 with the electrochromic layer in its thermally-transmissive state.

The smart window 10 is depicted in FIG. 2 with the polarity of battery 16 reversed with respect to that in FIG. 1 such that when switch 17 is closed, a field is generated across the layered structure so that ions are transmitted from the counter-electrode layer into the electrochromic layer 15, changing the structure of the electrochromic layer to the metallic or so-called "colored" state depicted in FIG. 2. In this state a large portion of the infrared energy is reflected by the electrochromic layer 15, as indicated by the reflection of the representative light ray 26.

To prevent the transfer of ions, the ion barrier layers are selected to have a high density microstructure which does not provide ion-conducting paths. That is, the crystals within these layers must form densely packed structures without openings or sites large enough to accommodate ions. It has been determined that zinc oxide, cadmium oxide and silicon carbide form crystals having densely packed structures that result in transparent coatings over the solar spectrum and are good electron conductors.

Zinc oxide coatings prepared by rf sputtering of ZnO were initially tested as ion barrier layers in the following manner. An electrode layer consisting of tin-doped indium oxide (ITO) was coated onto a glass substrate and the electrical properties of the ITO coating were measured. Subsequently lithium ions were inserted into the layer by rf sputtering from a lithium carbonate target onto the ITO coating and its electrical properties were measured in an attempt to determine lithium ion diffusion. The change in the electrical properties of the ITO indicated the immediate presence of lithium ions. The irreversibility of the lithium ions in the ITO coatings is believed due to the formation of reduced indium and/or tin oxide. A new ITO coating was deposited on a glass substrate and a coating of ZnO was deposited onto the ITO by rf sputtering to a thickness of approximately 150 nm. Subsequent deposition of lithium ions onto the ZnO failed to result in any change in the electrical properties of the ITO coating. This indicates that the ZnO completely prevents the transfer of lithium ions into the ITO coating.

Figure 3:
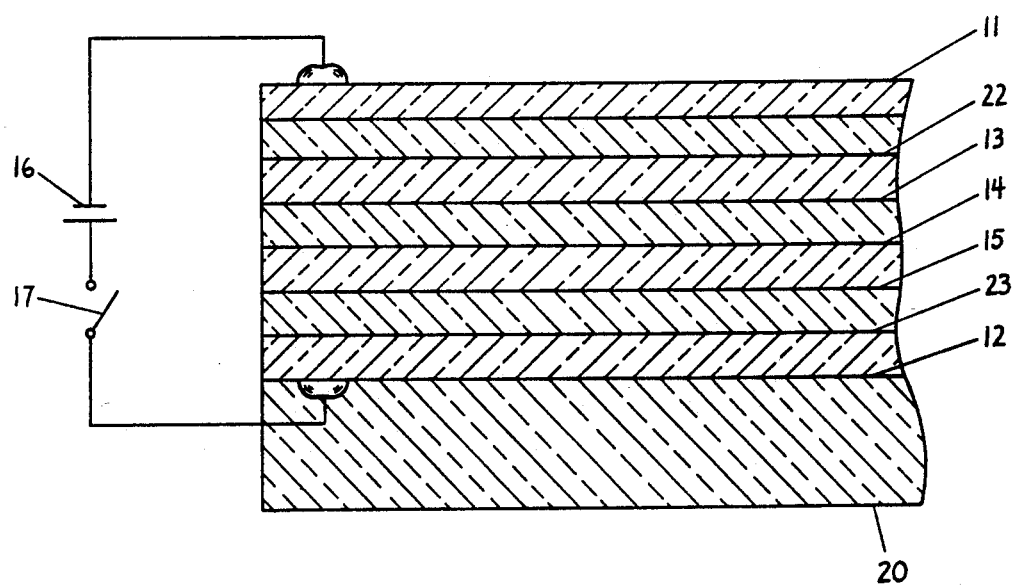
FIG. 3 is a cross-sectional side view of a seven-layer electrochromic device in accordance with the teachings of the invention.

The improved smart window 24 according to the invention is shown in FIG. 3 wherein a first ion barrier layer 22 of ZnO, CdO or SiC is arranged between the first outer electrode layer 11 and the counter-electrode layer 13 and a second ion barrier layer 23 of ZnO, CdO or SiC is interposed between the second electrode layer 12 and the electrochromic layer 15. The first and second ion barrier layers 22, 23 were found to effectively block the transfer of lithium ions into the outer electrode layers thereby substantially increasing the operating life of the smart window.

Although a seven-layered smart window is described herein with separate first and second outer electrode layers and intervening first and second ion barrier layers, a five-layer smart window similar to those depicted in FIGS. 1 and 2 is made possible by substituting the outer ITO electrode layers with the ion barrier ZnO, CdO or SiC layers. The electron-conducting and optically transparent properties of ZnO and CdO, with and without aluminum or indium doping, or SiC allow such materials to be used as the outer electrode layers.

Long life environmentally stable smart windows and solid state thin film batteries are herein described which utilize ZnO, CdO or SiC transparent electron conducting coatings to transfer electrons to the active layers without depleting the active layer of lithium ions.

Having thus described our invention, what we claim as new and desire to secure by Letters Patent is:

1. An electrochromic device comprising:
   a transparent substrate;
   a first transparent electrode layer on said substrate providing first electrical connection with an external source of electrical power;
   a first ion blocking-electron conducting layer on said first electrode layer preventing ion transport into said first electrode layer;
   an electrochromic layer on said first ion blocking-electron conducting layer said electrochromic layer being responsive to lithium ions;
   an ion-conductive-electron resistive layer on said electrochromic layer, said ion conductive-electron resistive layer capable of transporting said lithium ions into said electrochromic layer to transform said electrochromic layer into an optically-reflective state;
   a counter-electrode layer on said ion conductive-electron resistive layer, said counter-electrode layer capable of storing and delivering electrons and said lithium ions into said electrochromic layer; and
   a second transparent electrode layer on said substrate providing second electrical connection with said external source of electrical power.

2. The electrochromic device of claim 1 including a second ion blocking-electron conducting layer on said second transparent electrode layer preventing ion transport into said second transparent electrode layer.

3. The electrochromic device of claim 1 wherein said first ion blocking-electron conducting layer comprises zinc oxide, cadmium oxide or silicon carbide.

4. An electrochromic device comprising:
   a transparent substrate;
   a first combined ion blocking-electron conducting outer electrode layer on said substrate providing first electrical connection with an external source of electrical power;
   an electrochromic layer on said first combined ion blocking-electron conducting layer said electrochromic layer being responsive to lithium ions;
   an ion conductive-electron resistive layer on said electrochromic layer to transform said electrochromic layer into an optically reflective state;
   a counter-electrode layer on said ion conductive-electron resistive layer, said counter-electrode layer capable of storing said lithium ions and electrons for transporting into said ion conducting-electron resisting layer; and
   a second combined ion blocking-electron conducting outer electrode layer on said counter-electrode layer providing second electrical connection with said external source of electrical power.

5. The electrochromic device of claim 4 wherein said first combined ion blocking-electron conducting layer comprises zinc oxide, cadmium oxide or silicon carbide.

* * * * *